(12) United States Patent
Oyama

(10) Patent No.: US 6,966,673 B1
(45) Date of Patent: Nov. 22, 2005

(54) LIGHT DISTRIBUTION CONTROL DEVICE, BLIND, PARTITION, CURTAIN, TENT AND ILLUMINATOR

(75) Inventor: Nobuo Oyama, Tokyo (JP)

(73) Assignee: Kabushiki Kaisha S.T.I. Japan, Tokyo (JP)

( * ) Notice: Subject to any disclaimer, the term of this patent is extended or adjusted under 35 U.S.C. 154(b) by 94 days.

(21) Appl. No.: 10/363,411

(22) PCT Filed: Sep. 7, 2001

(86) PCT No.: PCT/JP01/07798

§ 371 (c)(1),
(2), (4) Date: Mar. 4, 2003

(87) PCT Pub. No.: WO02/23233

PCT Pub. Date: Mar. 21, 2002

(30) Foreign Application Priority Data

Sep. 11, 2000 (JP) .............................. 2000-274976

(51) Int. Cl.[7] ............................................ F21V 11/00
(52) U.S. Cl. ...................... 362/291; 362/354; 362/355; 362/576
(58) Field of Search ............................... 362/290–292, 362/351, 354, 355, 360, 361, 554, 557, 576; 359/595, 598, 596

(56) References Cited

U.S. PATENT DOCUMENTS 6,382,825 B1 * 5/2002 Wainwright ................. 362/576

FOREIGN PATENT DOCUMENTS

| EP | 0 560 107 B1 | 9/1993 |
|---|---|---|
| EP | 1 094 342 A1 | 4/2001 |
| EP | 1 098 209 A1 | 5/2001 |
| JP | 06 033671 | 2/1994 |
| JP | 07 296617 | 11/1995 |
| JP | 10012019 A | 1/1998 |
| JP | 11-344769 | 12/1999 |
| JP | 2000-028807 | 1/2000 |
| WO | WO 97/14982 A1 | 4/1997 |

* cited by examiner

*Primary Examiner*—Stephen F Husar
(74) *Attorney, Agent, or Firm*—Rothwell, Figg, Ernst & Manbeck, PC

(57) ABSTRACT

A light distribution control device including a substantially plate-like or film-like light diffusion structure which transmits or reflects light and at least one surface of which has a number of ridges arranged parallel to each other. The section of each ridge taken in a direction perpendicular to the longitudinal direction substantially constitutes a part of a circle, the surface of each ridge being smooth enough not to cause significant irregular diffusion of light. The ratio of diffraction light quantity to incidence light quantity is adjusted through selection of the angle of circumference and maximum diameter of the section of each ridge. The projection of diffusion distribution onto a plane perpendicular to both the longitudinal direction of the ridges and the surface of the structure is substantially symmetrical with respect to the normal at the point of incidence independently of the angle of incidence of the light.

15 Claims, 10 Drawing Sheets

LIGHT DISTRIBUTION CONTROL DEVICE, BLIND, PARTITION, CURTAIN, TENT AND ILLUMINATOR

TECHNICAL FIELD

This invention relates to a technique for gathering sunlight or controlling light flux from an artificial light source without using any driving unit.

BACKGROUND ART

In a conventional technique for gathering sunlight without using a driving unit, sunlight is diffused and introduced indoors or into a greenhouse by using a light transmitting thin plate having various ridges on its surface or a film-like structure on the surface of which a lot of ridges of various sectional configurations are arranged closely and in parallel. Further, by using a similar diffusion structure, light flux from a fluorescent lamp is diffused to thereby achieve a reduction in glare.

However, in the diffusion by such a light diffusion structure, the distribution of the diffused light is greatly influenced by the direction of the incident light. Also in the invention as disclosed in JP 7-296617 by the present applicant, there is involved a great unevenness in the distribution of the diffused light depending upon the angle of incidence, as stated in the embodiment section of the specification. Thus, in a system in which sunlight is taken indoors to substantially reduce the illumination power in the daytime, it is impossible to sufficiently solve the problem of the unevenness in indoor sunlight distribution. For the same reason, there is a limitation in the application of such a system to a greenhouse. Further, when applied to a fluorescent lighting equipment, such a system is not enough to eliminate the glare of the fluorescent lamp.

DISCLOSURE OF THE INVENTION

This invention has been made with a view toward solving the above problems. It is accordingly an object of this invention to clearly show the physical conditions of a mechanism which provides a diffusion distribution always symmetrical with respect to a fixed axis independently of the angle of incidence, and provide, on the basis thereof, a basic design for a light distribution control device actually capable of being commercially produced and various methods for applying such a light distribution control device, such as the taking of sunlight indoors or into a greenhouse, and light flux control for various lighting equipments.

According to the present invention, there is provided a light distribution control device comprising a substantially plate-like or film-like light diffusion structure which transmits or reflects light and at least one surface of which has a number of ridges arranged parallel to each other, in which the section of each ridge taken in a direction perpendicular to the longitudinal direction substantially constitutes a part of a circle, the surface of each ridge being smooth enough not to cause significant irregular diffusion of light, in which in a diffraction grating effect attributable to the parallel arrangement of a number of ridges, the ratio of diffraction light quantity to incidence light quantity is adjusted through selection of the angle of circumference and maximum diameter of the section of each ridge, and in which when light is caused to enter a surface of the light diffusion structure, the projection of diffusion distribution onto a plane perpendicular to both the longitudinal direction of the ridges and the surface of the structure is substantially symmetrical with respect to the normal at the point of incidence independently of the angle of incidence of the light.

After filing the patent application corresponding to the above-mentioned JP 7-296617, the present inventor made on an experimental basis a number of optical fiber diffusion structures using optical fibers and round bars of various diameters and examined them for distribution of diffused light. As a result, it has been found out that, as shown in FIG. 2, the projection of such diffusion distribution on a plane perpendicular to the surface of each ridge and the light diffusion structure is substantially symmetrical with respect to the normal at the point of incidence.

It has been found out that when a light gathering device as described in JP 7-296617 is formed by firmly pressing optical fibers against an adhesive film with a thick adhesion layer, the optical fibers arranged in parallel do not come into contact with each other, and gaps are generated therebetween, with adhesive being allowed to get into the gaps. In view of this, an adhesive film with an adhesion layer with a thickness of that of commercially available adhesion films was used, and optical fibers were lightly pressed against this for fixation, whereby the optical fibers were successfully brought into contact with each other and glued together. By using the light diffusion structure thus prepared, an experiment was conducted in accordance with Embodiment 1 described below. As a result, a symmetrical diffusion distribution was achieved. As the angle of incidence increases, the width of this diffusion distribution tends to become larger.

Further, by the experiment of Embodiment 2, a tendency toward a difference in symmetry due to a difference in fiber diameter or round bar diameter was found out. That is, as the fiber diameter is reduced, the symmetricalness in diffusion distribution was enhanced. It is to be assumed that this is attributable to a difference in the generation frequency of diffraction grating effect occurring in the same section in a direction perpendicular to the fiber due to the difference in fiber diameter. When the generation frequency of the diffraction grating effect occurring in the same section increases due to the arrangement of fibers with a small diameter, the frequency of generation of interference wave of the diffraction beam also increases. This means the amount of optical energy diffracted into interference wave increases. The assembly of interference waves constitutes a part of diffusion distribution, and the projection of diffusion distribution onto a plane perpendicular to the surface of the fibers and the structure is symmetrical with respect to the normal at the position of each incident beam. Thus, when in the whole diffusion distribution the proportion of the quantity of light causing diffraction and interference phenomenon increases, the symmetry property is enhanced. From visual observation of this phenomenon, it is to be assumed that the symmetry property in a diffusion distribution suitable for various applications of the present invention can be obtained by using a fiber having a diameter of approximately 3 mm or less. Depending on the application, however, a larger fiber having a diameter of approximately 5 mm can be used.

Further, the ridge configuration, which is originally completely round, was changed in various ways and the effect of the changes was examined; it has been found out that if the curved edge of the section is a circular arc, and the diameter of the circular arc is the same, the larger the angle of circumference of the curved edge, the more enhanced the symmetrical property.

If minimum circles including such curved edge are the same, the higher the circularity of the curved edge, the more enhanced the symmetrical property.

The basic constructions, manufacturing method, and various applications of structures in the form of plates, films, and cloths having the above properties and a light diffusion function and suitable for actual production on a commercial basis will be described below in Embodiments.

BEST MODE FOR CARRYING OUT THE INVENTION

Embodiments of this invention will now be described with reference to the accompanying drawings.

Embodiment 1

Figure 1A:
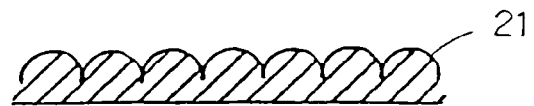
FIGS. 1A and 1B are sectional views of light distribution control devices according to Embodiment 1.

By careful operation, a large number of glass optical fibers having a diameter of 50 .m were arranged in parallel so as not to generate any gap therebetween and fixed to each other to form a light diffusion structure 21 or a lighting device having a sectional configuration as shown in FIG. 1A. A laser pointer beam was caused to enter this light diffusion structure 21. The maximum change in the maximum distribution band of the diffused transmission light with respect to the normal of the lighting device did not reach ¼of the change in the incident angle in a plane perpendicular to the longitudinal direction of the fibers and to the lighting device.

Figure 2:
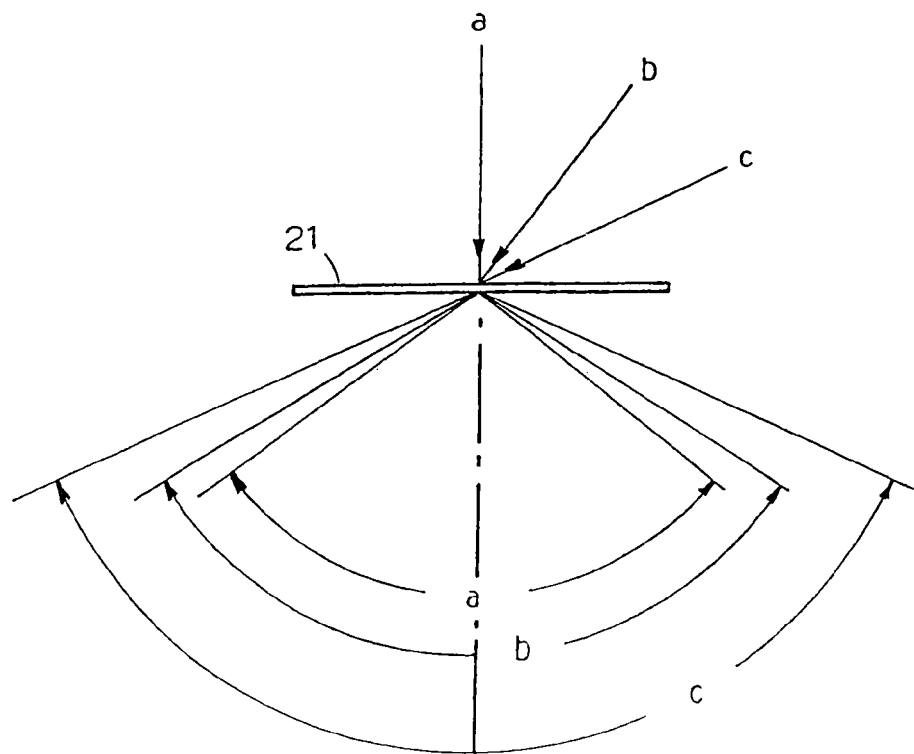
FIG. 2 is a diagram showing diffused light when a beam is caused to enter a light distribution control device according to Embodiment 1.

Further, as shown in FIG. 2, as a result of an experiment, the diffusion distribution projected onto a plane perpendicular to the longitudinal direction of the optical fibers and to the lighting device was generally symmetrical with respect to the normal on the light diffusion structure 21. Not only in the case (a) in which the beam was caused to perpendicularly enter the light diffusion structure 21 but also in the cases (b, c) in which the beam was caused to obliquely enter the light diffusion structure 21, the diffusion distribution was generally symmetrical with respect to the normal on the light diffusion structure 21.

Figure 1B:

In an experiment with a light diffusion structure 22 formed of glass optical fibers with a diameter of 50 .m and having a sectional configuration as shown in FIG. 1B, the result obtained was the same as that of the experiment with the light diffusion structure 21 shown in FIG. 1A.

Embodiment 2

Using plastic optical fibers having diameters of 0.125 mm, 0.5 mm, 1 mm, 2 mm, and 3 mm, and acrylic round bars having a diameter of 5 mm, experiments similar to that of Embodiment 1 were conducted. For the diameters of 1 mm and 2 mm, a parallel light flux of a laser pointer and a parallel beam of a xenon lamp were used, and for the diameters of 3 mm and 5 mm, a parallel beam of a xenon lamp was used.

As a result, a phenomenon similar to that of Embodiment 1 was observed. Regarding the degree of symmetry as described in Embodiment 1, it was reduced as the diameter increased. These results are obvious even through visual observation. Although symmetricalness is not to be denied with the one with the diameter of 5 mm, it is to be assumed, from the viewpoint of practical use, that possibility of a lot of applications is to be found in the range of less than 3 mm and not more than 50 .m.

Embodiment 3

Figure 3:
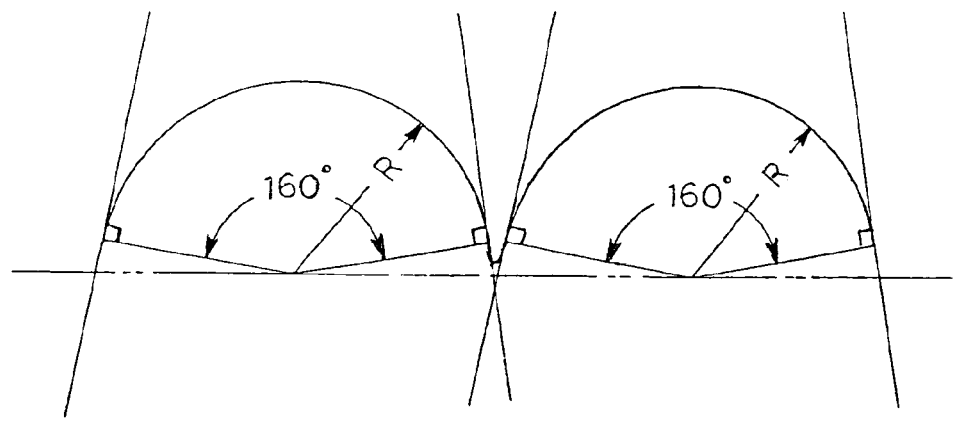
FIG. 3 is an enlarged view of a main portion of a light distribution control device according to Embodiment 3.

Using an acrylic resin material, a light diffusion structure was prepared in which on either side of a transparent thin plate having a thickness of approximately 2.8 mm a large number of ridges having arc-like curved edges with a radius of approximately 0.15 mm are in contact with each other, with the ridges on either side being parallel to each other. Due to the technical limitations in actual commercial production, the angle of circumference of the arcs is 160 degrees, as shown in FIG. 3, and a linear portion extending from the end of each arc is tangentially provided to a depth of approximately 0.15 mm as measured from the apex of the ridge to thereby bring the adjacent ridges into contact with each other, whereby commercial production of the structure is possible through extrusion. Regarding the ridges on either side, there were formed ones of the same phase and ones out of phase by 0.15 mm, with the parallelism of the ridges on either side being maintained.

By using this light diffusion structure, an experiment similar to that of Embodiment 1 was conducted. In both the ones of the same phase and the ones out of phase, the results obtained were the same as that of Embodiment 1.

Similar experiments were conducted on ones with the roundness of the arc-like portions of the curved edges modified and ones with elliptical and approximately circular curved edges. With a curved-edge roundness of approximately 10%, there was no problem from the viewpoint of practical use although there was a slight deterioration in symmetricalness and some spectral increase. In some applications, the function of the present invention could be exerted with a modification in roundness up to approximately 20%.

A similar experiment was conducted on opaque structures with no light diffusion function. The result obtained was the same as the above except that the light transmittance depended on the material.

Embodiment 4

A light diffusion structure was prepared in which ridges similar to those of Embodiment 3 were formed on one side of a plate approximately 2.2 mm thick, and an experiment similar to that of Embodiment 3 was conducted with the roundness modified in the same manner. The result showed that although being inferior in symmetricalness as compared to Embodiment 3, this embodiment allows application of the present invention while exerting the function of the present invention with roundness modification of up to approximately 10%.

Embodiment 5

Figure 4:
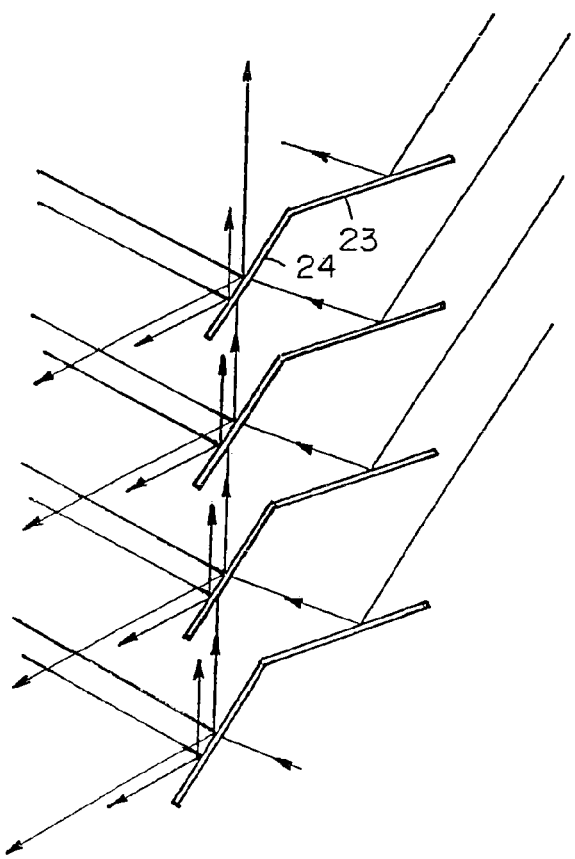
FIG. 4 is a side view of a blind according to Embodiment 5.
Figure 4A:
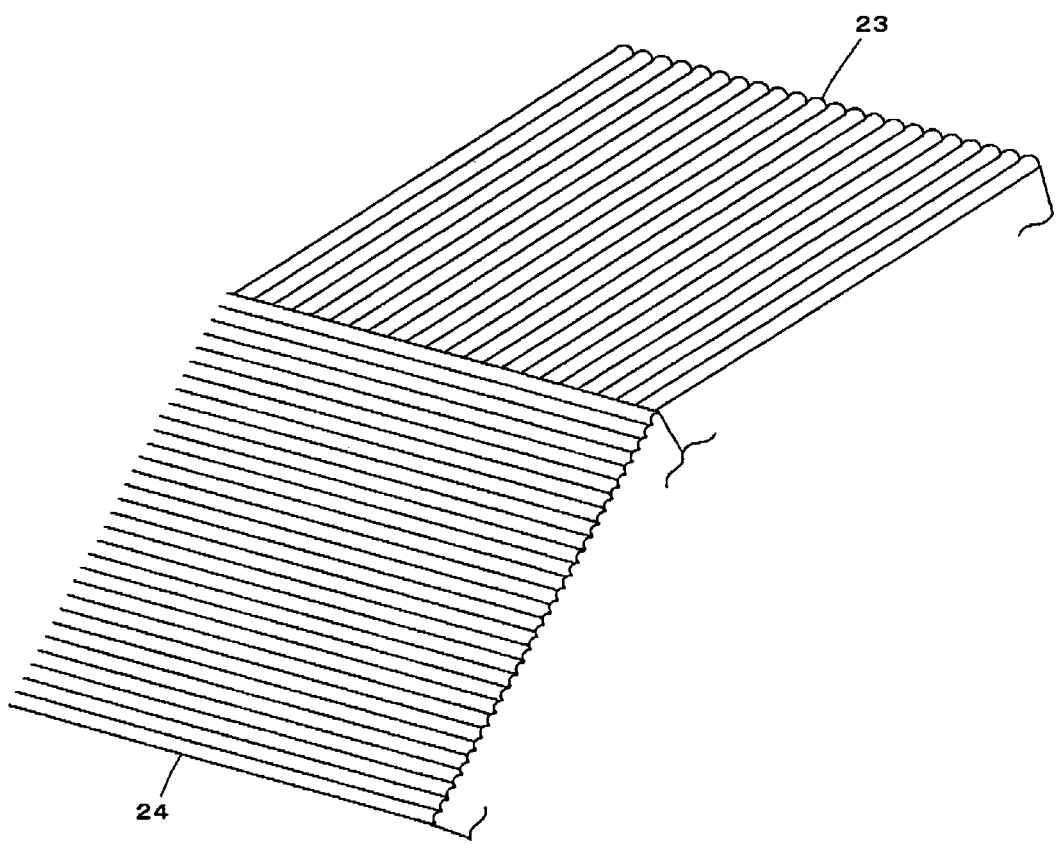
FIG. 4A is a three-quarter view of a blind according to Embodiment 5.

As in Embodiment 3, a transparent light diffusion structure having a thickness of approximately 1 mm was prepared. As shown in FIG. 4A, this structure was cut into a strip 23 of 28 mm×500 mm whose longitudinal direction is perpendicular to the direction of the ridge and a strip 24 of 25 mm×500 mm whose longitudinal direction is the direction of the ridge. As shown in FIG. 4, side edge portions extending their longitudinal directions are attached to each other at an angle of 140 degrees. Then, a reflective film was glued to the surface of the strip 23 of 28 mm×500 mm to prepare a blade. A plurality of such blades were prepared and arranged at intervals of 25 mm to form a Venetian (horizontal) blind. By using a parallel light flux of a xenon lamp, daily change in the incident angle of sunlight was simulated to examine the change in the light distribution of the diffused light flux obtained by the blind. In this case, angle adjustment was effected such that the beam from the lamp is first reflected by the portion where the reflective film is glued as shown in the figure, a part of the beam then entering the light transmitting portion of the blade positioned above (the strip 24 of 25 mm×500 mm).

As a result, independently of the change in the angle of incidence, the diffused light exhibited a light distribution substantially symmetrical with respect to an axis substantially perpendicular to the surface of the light transmitting portion.

Embodiment 6

Figure 5:
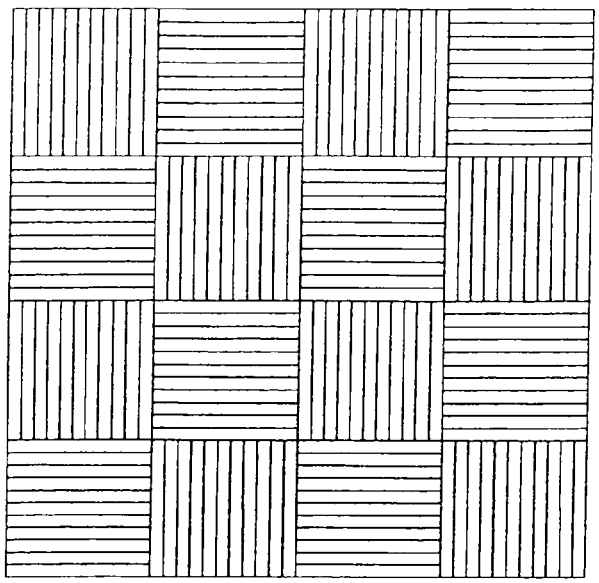
FIG. 5 is a plan view of a cloth according to Embodiment 6.

Twenty highly transparent polyester monofilaments having a round cross-sectional configuration and a diameter of 50 .m were arranged in a row and fused together into a strip. As shown in FIG. 5, using such strips as warps and wefts in a planar arrangement, a cloth of approximately 20 cm square was woven to be used as a light diffusion structure. When a parallel light flux from a xenon lamp was applied thereto, the diffused light exhibited a generally symmetrical light distribution in four directions with respect to an axis perpendicular to the cloth surface independently of changes in the irradiation angle of the beam.

This means that when a lace curtain fabric is woven by using such strips, such diffusion is to be observed for each strip direction. Further, it is also possible to prepare a curtain, tent and so on by using the above cloth.

As will be readily understood, when the threads are replaced by ones having a reflecting function, the reflective diffusion naturally exhibits similar diffusion distribution features.

Further, it is not always necessary to prepare the strip by arranging monofilaments in a single layer; the symmetricalness in diffusion distribution can also be achieved with a structure in which monofilaments are superimposed one upon the other in a bundle.

The easiest way of obtaining such a bundle is to give a minimum twist to a large number of monofilaments extruded simultaneously from a large number of nozzles of the monofilament producing apparatus so that the monofilaments can be held in contact with each other and united. When a fusion process is added, the bundle is further stabilized. In this case, the twist is given not more than one time for a length corresponding to five times the diameter of the monofilaments.

Embodiment 7

As in Embodiment 3, a transparent light diffusion structure having a thickness of approximately 1 mm was prepared, and a plurality of blades was formed varying the ridge direction for each small section to prepare a blind. When the blades are closed, one of the small sections always exerts, in correspondence with daily movement of the sun, its diffusion function such that sunlight is diffused into the room in a manner symmetrical with respect to a line substantially perpendicular to the blind surface.

Embodiment 8

Figure 6:
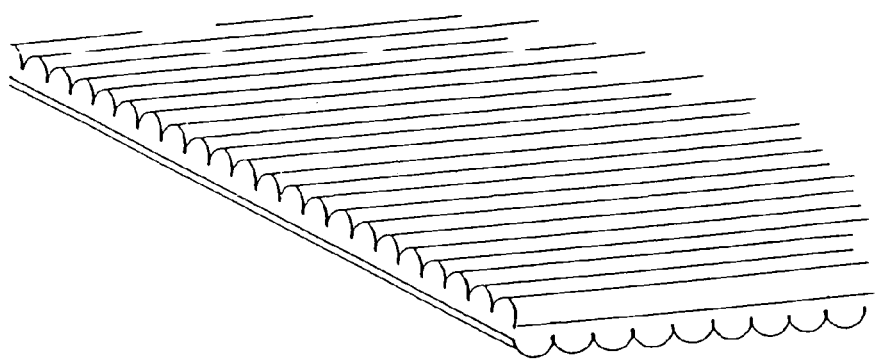
FIG. 6 is a perspective view of a light diffusion structure according to Embodiment 8.

As in Embodiment 3, a transparent light diffusion structure having a thickness of approximately 1 mm was prepared, and, as shown in FIG. 6, ridges were formed on either side of the structure such that their directions cross each other. A plurality of blades was prepared using such structures to form a blind. When the blades are closed, sunlight is diffused into the room in a manner symmetrical with respect to a line substantially perpendicular to the blind surface independently of the daily movement of the sun.

Embodiment 9

By using the light diffusion structure of Embodiment 3, a model of a vertical optical duct for a six-storied apartment was prepared. At the light inlet of the duct, the ridges were arranged to be horizontal from north to south so as to be adapted to the east-to-west movement of the sun. In the side surface of the duct, windows were formed to introduce sunlight into the rooms on each floor, and light diffusion structures according to Embodiment 3 were mounted with their ridges being horizontal.

A light flux from a metal halide lamp was imparted so as to simulate the movement of the sun. Measurement of the quantity of light obtained at each window showed that the above diffusion structure provides approximately double the quantity of light as compared to the conventional diffusion plate.

Similarly, it can be readily seen that the structure is applicable to various top light systems. That is, it is possible to combine transmission type systems, reflection type systems, or both types with their diffusion directions being varied. Further, from the above Embodiments 7 and 8, it will be readily understood that the features are applicable to a partition.

Embodiment 10

Figure 7A:
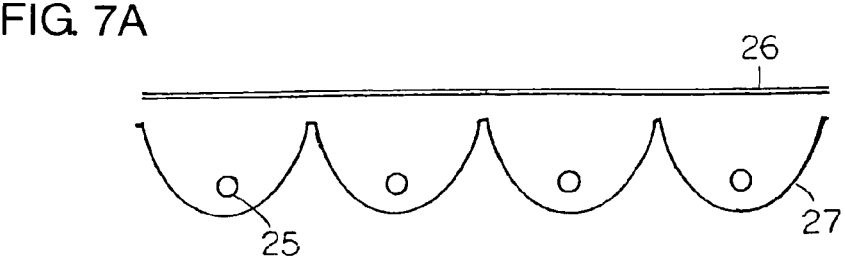
FIGS. 7A and 7B are side views of panel lights according to Embodiment 10.
Figure 7B:
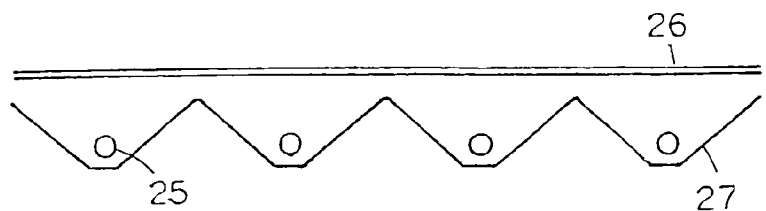

By using four fluorescent tubes 25 of high luminance having a diameter of 16 mm, mounting reflective members on the back and side of the tubes, and mounting the light diffusion structure 26 of Embodiment 3 in front of the tubes, a high luminance panel light for internal rhythm adjustment was prepared. Regarding the reflective member 27 on the back of each fluorescent tube, there were prepared one with an elliptical cross-sectional configuration as shown in FIG. 7A and the other linearly opening toward the light output surface (light diffusion structure) as shown in FIG. 7B, and they were examined for their performances. In both prototypes, the luminance value at a distance of 5 m was approximately double the value obtained by a conventional light diffusion structure in which a number of lenticular lenses are arranged in parallel. As shown in FIG. 2, the light diffusion structure of the present invention distributes even a lamp beam entering at a large angle of incidence in a manner symmetrical with respect to a line perpendicular thereto, whereby, at a distance, the light flux density in the light output direction is higher than in the peripheral region.

Embodiment 11

A light source such as a fluorescent lamp is situated at a side end of a thin lighting equipment, and a light diffusion structure according to the present invention is situated on the front side. Light that comes from the light source and enters at a large angle of incidence is diffused and distributed in a symmetrical manner by the light diffusion structure. This makes it possible to maintain more of the beam in the front direction than in the case of illumination by a conventional edge light system independently of the angle of incidence of the light from the lamp, whereby it is possible to maintain a more uniform luminance in the front direction over the entire light output surface.

Figure 8A:
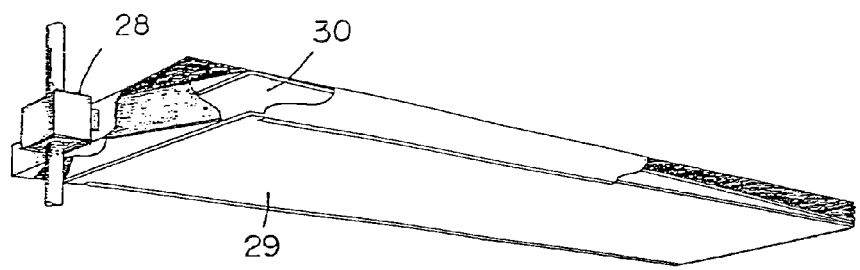
FIG. 8A is a perspective view of a lighting equipment according to Embodiment 11.

As shown in FIG. 8A, a lamp housing 28 containing one 21 W fluorescent lamp with a tube diameter of 16 mm manufactured by Philips was situated at a longitudinal side edge of a lighting equipment of approximately 90 cm×65 cm and 7 cm thick, and a light diffusion structure 29 according to Embodiment 3 was used in the light output surface with the direction of the ridges being the same as the longitudinal direction of the fluorescent lamp. As the result, an output light quantity of 1300 lm was obtained from the lighting equipment. The total light flux amount of the lamp is 2100 lm, which means approximately 70% of the lamp beam is output. The illuminance at the light output surface was 4500 lx at maximum and 2500 lx at minimum. Thus, a very uniform distribution was achieved.

On the inner side of the back light of this lighting equipment, a reflection plate 30 was provided, such that the distance between the reflection plate 30 and the light output surface gradually decreases as the distance from the lamp housing 28 increases.

Figure 8B:
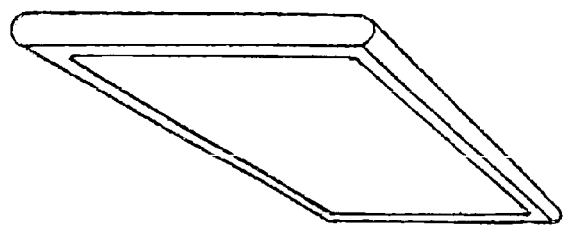
FIGS. 8B and 8C are a perspective view and a partial sectional view of a lighting equipment according to a modification of Embodiment 11.
Figure 8C:
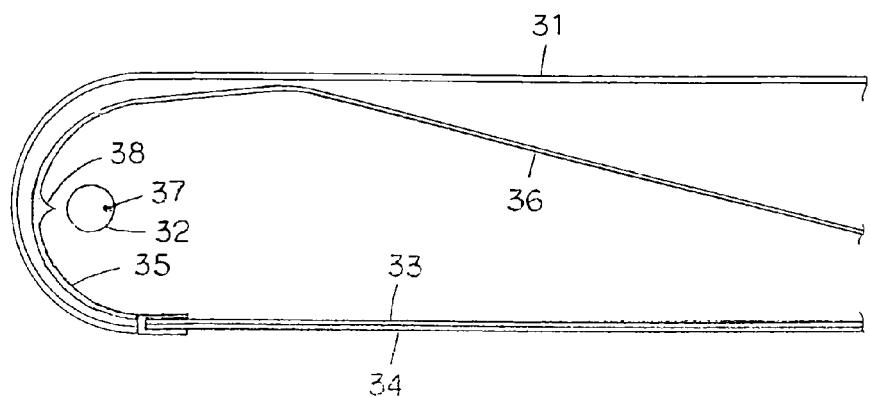

Further, as shown in FIG. 8B, it is possible to prepare a planar lighting equipment in which a fluorescent tube is situated on either side edge or one side edge. FIG. 8C is a sectional view of the portion in the vicinity of one side edge of this planar lighting equipment. A fluorescent tube 32 is arranged in a side edge portion of a frame 31, and light diffusion structures 33 and 34 constituting the light output surface are superimposed one upon the other and fastened to the frame 31. Like the light diffusion structure of Embodiment 3, the light diffusion structures 33 and 34 include thin plates with a large number of ridges formed on either side with the directions of ridges of the two light diffusion structures being perpendicular to each other. In the frame 31, an elliptical reflection body 35 is arranged so as to surround the fluorescent tube 32 and a flat reflection body 36 is connected to the elliptical reflection body 35. The distance between the reflection body 36 and the light output surface decreases as the distance from the fluorescent tube 32 increases. The center of the fluorescent tube 32 is situated slightly to the rearward of the focus 37 of the elliptical reflection body 35. Further, a protrusion 38 is formed on the surface portion of the elliptical reflection body 35 situated behind the fluorescent tube 32, and the light emitted rearwards from the fluorescent tube 32 is reflected by the protrusion 38, whereby the light travels efficiently to the front of the fluorescent tube 32, that is, in the direction of the light output surface or the reflection body 36.

Due to this construction, a thin planar lighting equipment is realized which has a high light output efficiency and a uniform surface light output property.

It is also possible for each of the light diffusion structures 33 and 34 to have ridges on only one side thereof as in Embodiment 4. Further, instead of using the two light diffusion structures 33 and 34, it is also possible to use a single light diffusion structure on either side of which ridges are formed so as to cross each other as in Embodiment 8 shown in FIG. 6. Further, it is also possible to use a cloth-like light diffusion structure like that of Embodiment 6 shown in FIG. 5.

Embodiment 12

Figure 9A:
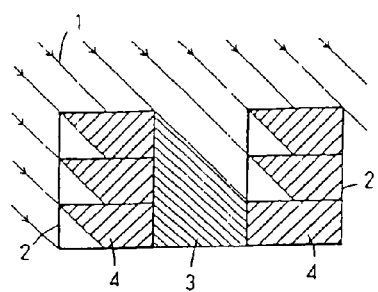
FIGS. 9A and 9B are diagrams showing sunlight shining into two conventional buildings and the shade.
Figure 9B:
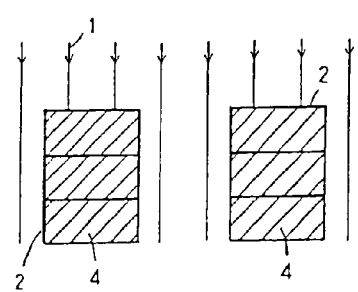

As shown in FIG. 9A, two three-storied buildings 2 stand side by side. In this case, when sunlight flux 1 comes down from the left side, there are formed a shade portion 3 due to the presence of one building and indoor shade portions 4 due to the building structure. Similarly, as shown in FIG. 9B, when sunlight flux 1 comes vertically downwards, indoor shade portions 4 are formed.

Figure 9C:
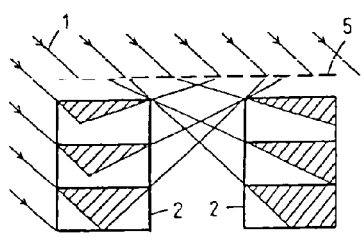
FIGS. 9C through 9E are diagrams showing sunlight shining into two buildings to which Embodiment 12 of this invention is applied and the shade.
Figure 9D:
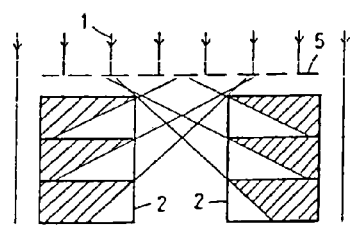
Figure 9E:
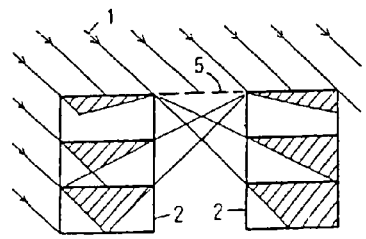

In view of this, as shown in FIG. 9C, a light diffusion structure 5 of the present invention is provided above the two buildings 2. The light diffusion structure 5 is oriented such that the ridges on the surface thereof are substantially parallel to the opposing surfaces of the two buildings 2. As shown in FIGS. 9C and 9D, the sunlight flux 1 is diffused by the light diffusion structure 5, and the diffused light reaches the regions or portions which have conventionally been in the shade. It can be seen that the shade regions indicated by cross-hatching in FIGS. 9C and 9D are substantially reduced as compared to the shade regions of FIGS. 9A and 9B, in which no light diffusion structure 5 is used. As shown in FIG. 9E, it is also possible to provide the light diffusion structure 5 at the uppermost level of the two buildings 2.

Embodiment 13

Figure 10A:
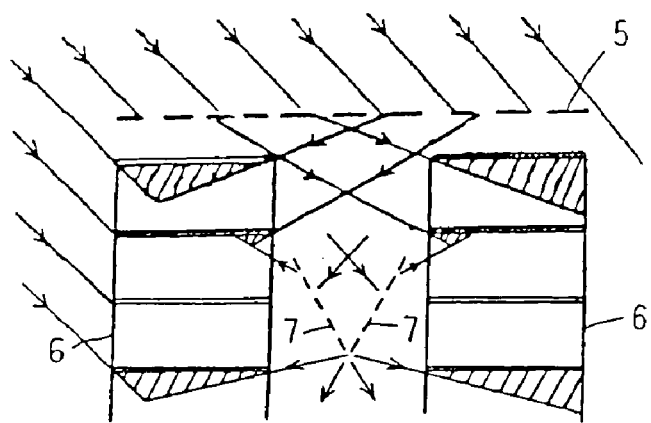
FIGS. 10A and 10B are diagrams showing sunlight shining into two buildings to which Embodiment 13 of this invention is applied and the shade.

As shown in FIG. 10A, when, in addition to the light diffusion structure 5 provided above two buildings 6, light diffusion structures 7 are provided between the two buildings 6, the quantity of light flux supplied to the interiors of the buildings 6 increases, whereby the proportion of the light left unused is further reduced and the uniformity in light distribution can be enhanced.

Figure 10B:
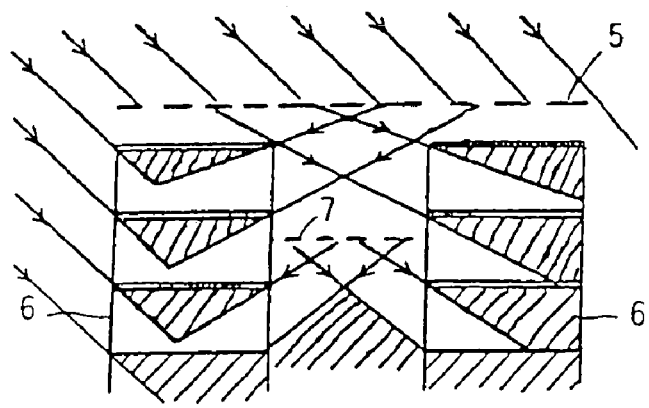

If the light diffusion structure 7 is arranged horizontally between the two buildings 6 as shown in FIG. 10B, much of the sunlight flux entering the light diffusion structure 7 is supplied to the interiors of the two buildings 2.

Embodiment 14

Figure 11A:
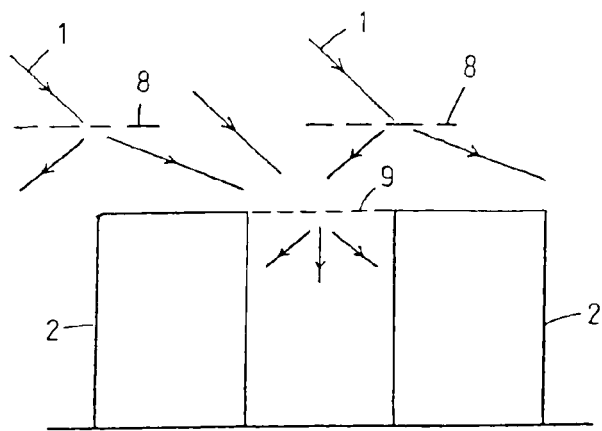
FIGS. 11A through 11C are diagrams showing sunlight shining into two buildings to which Embodiment 14 is applied.

As shown in FIG. 11A, it is possible to cause sunlight flux 1 shining in on the tops of two buildings 2 to enter light diffusion structures 8 provided respectively above the buildings 2 to thereby direct a lot of light between the buildings 2; further, it is possible to provide a light diffusion structure 9 between the buildings 2 and at the same level as the tops of the buildings 2 and cause light flux to go down while undergoing diffusion or refraction or division or a combination of diffusion and refraction.

In this method, it is possible to supply more light between the two buildings 2 as compared to the method in which only one light diffusion structure 5 is used as shown in FIGS. 9C, 9D and 9E.

Figure 11B:
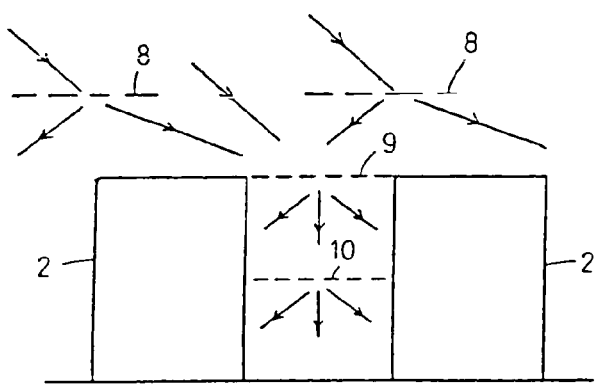
Figure 11C:
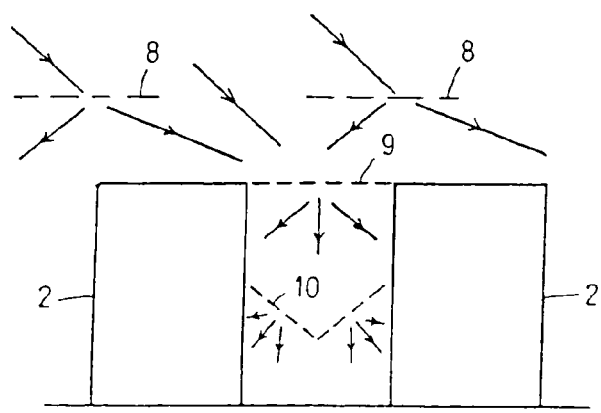

Further, as shown in FIGS. 11B and 11C, by providing a light diffusion structure 10 or light diffusion structures 10 below the light diffusion structure 9 and between the two buildings 2, it is possible to introduce a still larger amount of light flux into the buildings 2.

When applying the above-described embodiments to the growing of plants in a greenhouse, the buildings 2 may be replaced by cultivation shelves or tall plants; in this case also, it is possible to achieve a substantial improvement in sunlight utilization factor and greenhouse space utilization factor.

When applying this invention to raising or a culture pool for algae or photosynthetic bacteria, the water surface is covered with a light diffusion structure, whereby it is possible to reduce the reflection at the water surface of light entering the water surface at a large angle of incidence, thereby making it possible to introduce more light into the water. In this case, the direction of the ridges of the light diffusion structure is adjusted according to the place of use such that as much sunlight as possible can be introduced into the water.

Further, by providing a light diffusion structure above the water surface, it is possible to gather light flux in a particular water region and supply more light to what is being grown or cultivated underwater. In this case, by covering the surface of the particular water region with the light diffusion structure, it is possible to enhance the rate at which light is taken into the water. Further, it is possible to add a light diffusion structure under water or provide a reflection body to thereby achieve an improvement in the sunlight utilization factor.

Embodiment 15

Figure 12A:
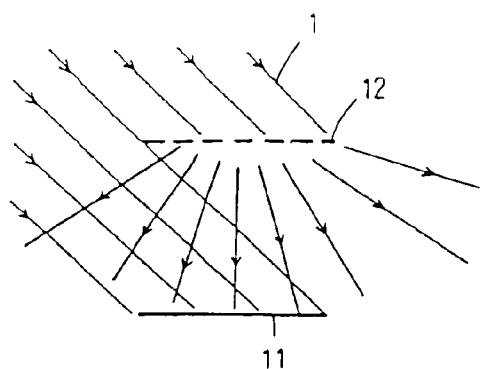
FIGS. 12A and 12B are diagrams showing light shining into a solar cell panel to which Embodiment 15 is applied.
Figure 12B:
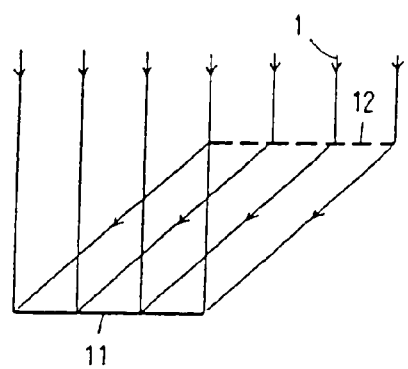

As shown in FIGS. 12A and 12B, a light diffusion structure 12 is provided in the vicinity of a solar cell panel 11, and sunlight 1 directed toward the circumference of the solar cell panel 11 is condensed on the solar cell panel 11 through diffusion or refraction or division or a combination of diffusion and refraction by the light diffusion structure 12, whereby it is possible to increase the power generation amount of the solar cell.

By condensing environmental sunlight or artificial light in the same manner as in FIGS. 12A and 12B, it is possible to introduce more light into a specific region in a room.

Embodiment 16

Figure 13:
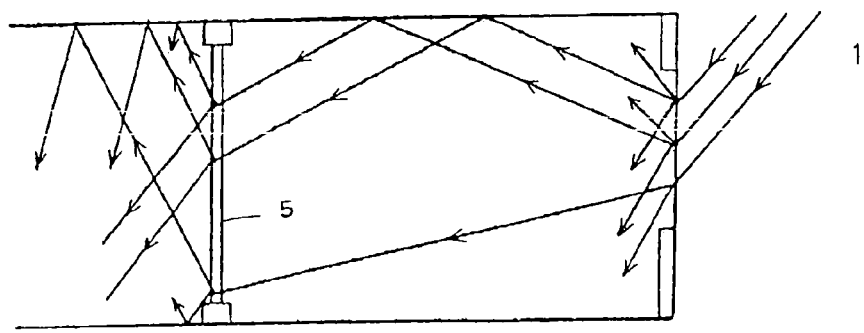
FIG. 13 is a diagram showing light shining into a room to which Embodiment 16 is applied.

Conventional partitions used indoors or the like consist of non-diffusing bodies, so that they intercept light from the outside. Thus, in a space defined by such partitions, illumination equipment is often required to compensate for the shortage of light. When, as shown in FIG. 13, a light diffusion structure 5 according to the present invention is used as a partition, it is possible to take light into the space on the inner side of the partition without having to use any special illumination equipment.

Figure 14:
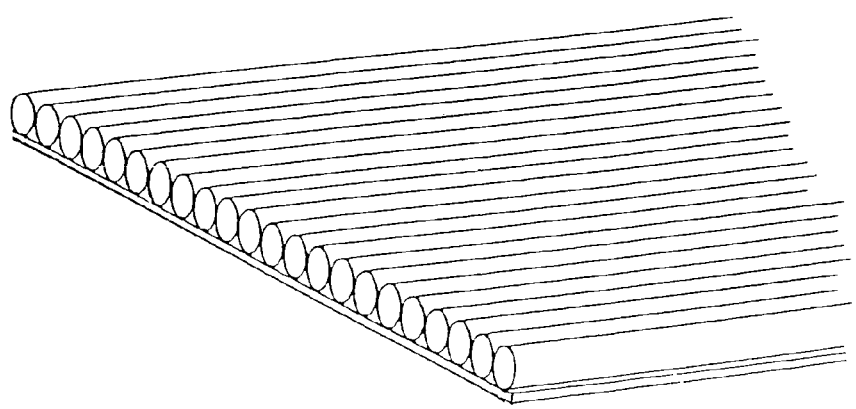
FIG. 14 is a perspective view of a light diffusion structure according to a modification.
Figure 15A:
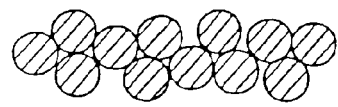
FIGS. 15A through 15I are sectional views showing light diffusion structures according to other modifications.
Figure 15B:
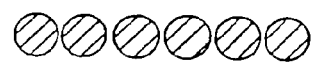
Figure 15C:
Figure 15D:
Figure 15E:
Figure 15F:
Figure 15G:
Figure 15H:
Figure 15I:

The sectional configuration of the light diffusion structure is not restricted to those shown in FIGS. 1A and 1B. For example, as shown in FIG. 14, it is also possible to adopt a construction in which a number of round bars are arranged in parallel on a thin flat plate so as to be in contact with each other and fixed together. It is also possible to adopt sectional configurations as shown in FIGS. 15A through 15I.

As described above, in accordance with this invention, there is provided a light diffusion structure which always exhibits a diffusion distribution that is symmetrical with respect to an axis in a fixed direction independently of the angle of incidence, and, by using this structure, it is possible to perform various light distribution controls.

What is claimed is:

1. A light distribution control device comprising a substantially plate-like or film-like light diffusion structure which transmits or reflects light and at least one surface of which has a number of ridges arranged parallel to each other, the section of each ridge taken in a direction perpendicular to the longitudinal direction substantially constituting a part of a circle, the surface of each ridge being smooth enough not to cause significant irregular diffusion of light, in a diffraction grating effect attributable to the parallel arrangement of a number of ridges, the ratio of diffraction light quantity to incidence light quantity being adjusted through selection of the angle of circumference and maximum diameter of the section of each ridge, when light is caused to enter a surface of the light diffusion structure, the projection of diffusion distribution onto a plane perpendicular to both the longitudinal direction of the ridges and the surface of the structure being substantially symmetrical with respect to the normal at the point of incidence independently of the angle of incidence of the light.

2. A light distribution control device according to claim 1, wherein the light diffusion structure is formed of a material which transmits light, the ridges being formed on both sides of the light diffusion structure such that their directions extend in the same direction.

3. A light distribution control device according to claim 1, wherein the light diffusion structure is formed of a material which transmits light, the ridges being formed on both sides of the light diffusion structure such that their directions cross each other.

4. A blind comprising a plurality of blades each formed of a light distribution control device according to claim 1, a ridge direction of a first small section differing from a ridge direction of a second small section, whereby, when the blades are closed, the diffusing function of any one of said first or second small sections is exerted, in correspondence with daily movement of the sun, such that sunlight is diffused indoors symmetrically with respect to a line substantially perpendicular to the blind surface.

5. A partition using a light distribution control device according to claim 1.

6. A lighting equipment using a light distribution control device according to claim 1.

7. A light distribution control device according to claim 1, wherein light is caused to enter a surface of a structure which transmits light, the light being diffused, whereby it is possible to introduce light to a region or portion which it has been impossible for sufficient light to reach and which has constituted a shade.

8. A light distribution control device according to claim 1, wherein, by using the light diffusion structure which transmits light, light entering a region or portion adjacent to a specific region or portion is diffused before the entering, whereby the light entering the adjacent region or portion is partially or entirely led to the specific region or portion to thereby increase the quantity of light flux entering the specific region or portion and decrease the quantity of light entering the adjacent region or portion.

9. A light distribution control device according to claim 8, wherein the light diffusion structure is formed of a bundle or arrangement of a large number of monofilaments or bar-like bodies or a fabric containing a large number of monofilaments or bar-like bodies.

10. A light distribution control device according to claim 8, wherein light flux entering a specific region or portion is led to a region or portion where a sufficient quantity of light cannot reach to form a shade.

11. A light distribution control device comprising a light diffusion structure in the form of a strip or a bundle formed of a plurality of transparent or reflective threads arranged in parallel and fused or glued together, the section of each thread taken in a direction perpendicular to the longitudinal direction thereof being circular and the surface of each thread being substantially smooth enough not to cause irregular diffusion, in a diffraction grating effect attributable to close connection of a plurality of threads, the ratio of diffraction light quantity to incidence light quantity being adjusted through selection of the thickness of the threads, when light is caused to enter the light diffusion structure, the projection of diffusion distribution onto a plane perpendicular to the threads being substantially symmetrical with respect to the normal at the point of incidence independently of the angle of incidence of the light.

12. A blind using light distribution control devices according to claim 11 as blades.

13. A partition using a light distribution control device according to claim 11.

14. A lighting equipment using a light distribution control device according to claim 11.

15. A curtain using a cloth woven of light distribution control devices according to claim 11.

* * * * *